United States Patent
Maekawa et al.

(10) Patent No.: US 7,104,773 B2
(45) Date of Patent: Sep. 12, 2006

(54) THREE-DIMENSIONAL LAMINATING MOLDING DEVICE

(75) Inventors: Tsutomu Maekawa, Hitachinaka (JP); Akemi Ouchi, Hitachinaka (JP); Hidetoshi Fujii, Hitachinaka (JP); Kunihiro Tamahashi, Hitachinaka (JP); Yutaka Shoji, Hitachinaka (JP); Hiroshi Takahagi, Hitachinaka (JP)

(73) Assignee: Ricoh Printing Systems, Ltd., Tokyo (JP)

( * ) Notice: Subject to any disclaimer, the term of this patent is extended or adjusted under 35 U.S.C. 154(b) by 74 days.

(21) Appl. No.: 10/785,954

(22) Filed: Feb. 26, 2004

(65) Prior Publication Data

US 2004/0175451 A1  Sep. 9, 2004

(30) Foreign Application Priority Data

Mar. 7, 2003  (JP) ............... P2003-060728

(51) Int. Cl.
  *B28B 17/00* (2006.01)

(52) U.S. Cl. .......... 425/174.4; 425/144; 264/497; 264/113; 264/494; 264/496; 264/308

(58) Field of Classification Search ........ 425/144, 425/174.4; 264/497, 113, 494, 496, 308
See application file for complete search history.

(56) References Cited

U.S. PATENT DOCUMENTS

| 5,059,266 | A | * | 10/1991 | Yamane et al. | 156/64 |
| 5,140,937 | A | * | 8/1992 | Yamane et al. | 118/695 |
| 5,260,009 | A | * | 11/1993 | Penn | 264/401 |
| 5,348,693 | A | * | 9/1994 | Taylor et al. | 264/401 |
| 5,424,767 | A | * | 6/1995 | Alavizadeh et al. | 347/17 |
| 6,395,811 | B1 | * | 5/2002 | Nguyen et al. | 524/198 |
| 6,454,987 | B1 | * | 9/2002 | Katoh et al. | 264/447 |
| 6,799,959 | B1 | * | 10/2004 | Tochimoto et al. | 425/130 |
| 2002/0101464 | A1 | * | 8/2002 | Iriguchi | 347/11 |
| 2003/0173713 | A1 | * | 9/2003 | Huang | 264/401 |
| 2004/0251581 | A1 | * | 12/2004 | Jang et al. | 264/497 |
| 2005/0093208 | A1 | * | 5/2005 | Boyd et al. | 264/442 |
| 2005/0212835 | A1 | * | 9/2005 | Konno | 347/6 |

FOREIGN PATENT DOCUMENTS

| JP | 2-307731 | 12/1990 |
| JP | 6-179243 | 6/1994 |
| JP | 9-123290 | 5/1997 |
| JP | 2697138 | 9/1997 |
| JP | 2001-58357 | 3/2001 |
| JP | 3179547 | 4/2001 |
| JP | 2001-150556 | 6/2001 |
| JP | 2001-214098 | 8/2001 |

* cited by examiner

*Primary Examiner*—Robert Davis
*Assistant Examiner*—G. Nagesh Rao (74) *Attorney, Agent, or Firm*—Whitham, Curtis, Christofferson & Cook, PC (57) ABSTRACT

A three-dimensional laminating molding device includes ejection heads that eject support material for a support, and an ejection head that ejects mold material for a mold. The support material is sold at room temperature. An inner temperature of the laminating molding device during the laminating molding is controlled to a range of (a melting point of the support material−30)° C. to (the melting point of the support material−5)° C.

10 Claims, 6 Drawing Sheets

THREE-DIMENSIONAL LAMINATING MOLDING DEVICE

BACKGROUND OF THE INVENTION

1. Field of the Invention

The present invention relates to a three-dimensional laminating molding device that forms three-dimensional objects using an inkjet system.

2. Related Art

A principle of a laminating molding is the same as that of a method for forming a three-dimensional contour map. That is, a three-dimensional object is sliced to produce sliced shapes, and then the sliced shapes are molded and laminated one on the other.

Examples of laminating molding methods include stereolithography using a photo-curing resin, powder lamination using metallic or resin powders, melt deposition in which resin is melted and deposited, and sheet lamination in which paper sheets, plastic sheets, or thin metal plates are laminated.

These laminating molding methods have spread rapidly along with a recent spread of a three-dimensional Computer Aided Design (CAD) and are also called rapid prototyping techniques. In these laminating molding methods, a three-dimensional object can be directly obtained from three-dimensional CAD data. The rapid prototyping technique is not only used in the field of trial manufacture, but also in the field of actual manufacture, since metallic molding has become possible. Further, by using a three-dimensional printer, a digitizer, or a scanner as an output device of a three-dimensional CAD, the rapid prototyping technique has become used also as a three-dimensional copying machine. In particular, a laminating molding device using an inkjet system is expected to be used in general-purpose three-dimensional printers or three-dimensional copying machines because the laminating molding device using an inkjet system has a simple configuration and is easy to handle compared with those using different system.

The laminating molding methods using an inkjet system are classified into a powder laminating method and a melt resin deposition method. The powder laminating method is developed by Massachusetts Institute of Technology. In the powder laminating method, binder is ejected into a powder layer of starch or plaster using an inkjet device, and then the ejected binder is cured. On the other hand, in the melt resin deposition method, resin is ejected to directly form a laminated shape without using any support layer.

The powder laminating method using powders requires a removal of unnecessary powders after molding and is not suited for an office environment because the powders scatter. Thus, the powder laminating method is less apt to a general-purpose three-dimensional printer or three-dimensional copying machine. On the other hand, the melt resin deposition method can be used in an office environment and is suited for the general-purpose three-dimensional printer or the three-dimensional copying machine.

The melt resin deposition method includes a method in which an arm of a robot attached with an ejection nozzle (the same as an inkjet head, in principle) is moved in three dimensions of XYZ and a method in which an inkjet head is placed in an X-Y plane and a Z direction. However, because these methods do not use a support for supporting a mold during molding process, floating island shapes (shapes that suddenly appear in layers when laminating sliced data) or long beam shapes, such as a crossbar of a letter H, could not be formed by these methods. Therefore, moldable shapes are restricted, and so these methods are not suited for forming complex shapes, such as practical industrial products and medical models.

As a counter measure for those, Japanese Patent No. 3179547 proposes a method that uses a support. Specifically, support resin and mold resin are both laminated, and a surface is planarized if necessary. By this method, even complex shapes can be molded. The support can be formed such that a mold is buried within the support. Alternatively, a columnar or tabular support can be formed at necessary places. However, the former method is preferable from a view of enabling correspondence to any complex shape and not requiring special data processing. (The latter method requires data processing for providing the support.)

Materials used in such an inkjet-type laminating molding are classified into materials which are liquid at room temperature and materials which are solid at room temperature. There has been proposed to use photo-curing resin or thermosetting resin, which is liquid at room temperature, for the inkjet-type laminating molding. However, if viscosity of the resin is high, then clogging occurs in nozzles, and on the contrary, if viscosity is low, then "dripping" occurs during photo-curing or thermosetting after lamination. Therefore, Japanese Patent No. 2697138 proposes to emit light in a flight path of the photo-curing resin droplets so as to irradiate the resin droplets in flight with the light. However, this method had a disadvantage that leakage light or reflected light irradiates an inkjet head, resulting in clogging of nozzles.

On the other hand, as a material which is solid at room temperature, resin which converts to liquid by heating, such as wax or hot melt resin, is often used. In Japanese Patent-Application Publication No. HEI-9-123290, the method in which a support is formed such that a mold is buried within the support is used, and materials with different melting points are used for the mold and the support so that the support can be removed by using a difference in melting points after mold process. However, those materials have some disadvantages. That is, these materials are brittle as a mold material, and the molds are easily broken. Further, these materials warp from shrinkage so that dimensional stability of the molds is impaired.

In order to overcome the brittleness of material, Japanese Patent-Applications Publication No. 2001-214098 proposes a mold material to which ductility is imparted.

Also, in order to maintain the dimensional stability of molds, Japanese Patent-Application Publication No. 2001-58357 proposes a method in which laminating molding is performed while performing a smoothing process using a revolving or high-temperature roller, a rotary cutter, or the like, every time a single layer or several layers of mold are formed. However, performing the smoothing process during the laminating molding process lowers a laminating molding speed.

SUMMARY OF THE INVENTION

In the view of foregoing, it is an object of the present invention to overcome the above problems, and also to provide a three-dimensional laminating molding device that can highly-precisely form three-dimensional complex objects at high speed.

In order to achieve the above and other objects, the present invention provides a three-dimensional laminating molding device including a first ejecting unit that ejects a support material so as to form a support layer for burying a mold, a second ejecting unit that ejects a mold material for a mold, a casing that houses the first and second ejecting units, and a controller that controls an inner temperature of the casing. The controller controls the inner temperature of the casing to a range from a temperature 30° C. lower than the melting point to a temperature 5° C. lower than the melting point.

PREFERRED EMBODIMENT OF THE PRESENT INVENTION

An explanation will be provided for a three-dimensional laminating molding method according to a present embodiment.

Figure 1A:
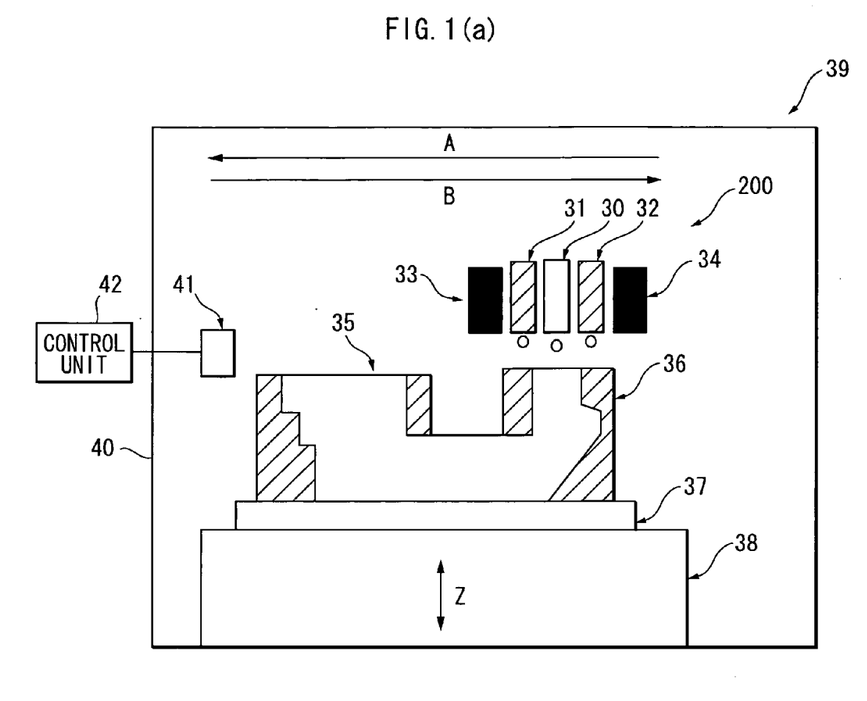
FIG. 1(a) is a schematic side view of a laminating molding device according to an embodiment of the present invention.

First, a surface data or a solid data of a three-dimensional shape, which has been designed using a three-dimensional CAD or scanned using a three-dimensional scanner or digitizer, is converted to an STL (Structured Template Language) format and entered into a laminating molding device 39 shown in FIG. 1(a). A molding direction of the three-dimensional shape to mold is determined based on the entered STL data. The molding direction is not particularly restricted, but generally, a direction in which a length of the object in a Z direction (height direction), i.e., a height, becomes the lowest is selected. Then, project areas to an X-Y plane, an X-Z plane, and a Y-Z plane of the three-dimensional shape are determined. For a reinforcement of a block shape, each of the planes, other than the top surface of the X-Y plane, is shifted outward by an adequate amount. The shafting amount is not particularly restricted and differs depending on a shape, a size, and a material to use, but is generally about 1 to 10 mm. In this manner, a block shape confining a shape to mold (the top surface is open) is specified. Next, the block shape is sliced in the Z direction into pieces with one-layer thickness. The one-layer thickness depends on a material to use, but is generally 20 to 60 μm. If there is only one object to mold, the block shape is placed at the center of a Z-stage 38 to be described later (a table which descends by one-layer distance each time one-layer molding completes). If there are two or more objects to mold, the corresponding block shapes can be placed on the Z-stage 38 or can be stacked one on the other. Preparation of those block shapes and slice data (contour data) and placing the block shapes on the Z-stage 38 can be automatically carried out when a material to use is specified.

Next, a laminating molding is performed using the molding device 39 shown in FIG. 1(a). That is, a support layer 36 is formed by ejecting a support material from ejection heads 31, 32, and simultaneously with this, a mold 35 is formed by ejecting a mold material from an ejection head 30 of the molding device 39. At this time, a position of ejecting the support material and a position of ejecting the mold material are controlled by an approximate determination (judging which of the support material and the mold material to eject to a position on a profile line) based on an outermost frame of the profile line of the slice data.

Figure 1B:
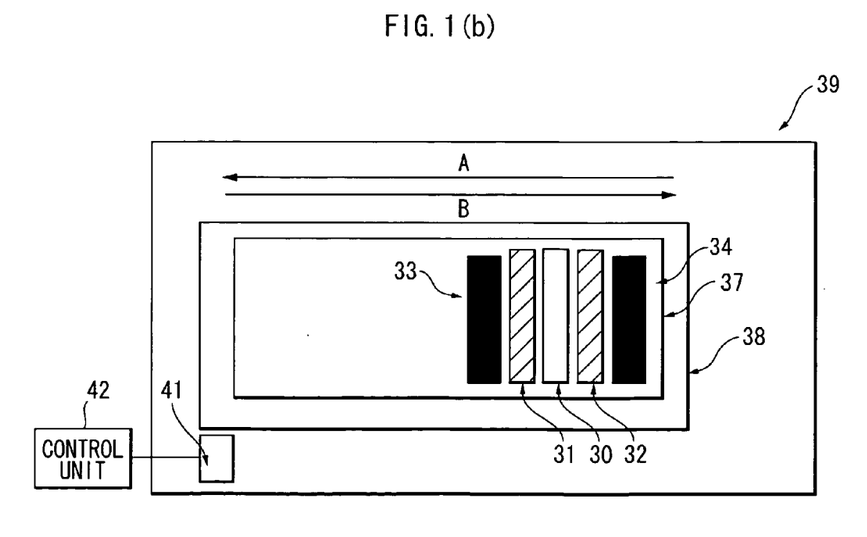
FIG. 1(b) is a schematic top view of the laminating molding device of FIG. 1(a)

A configuration of the molding device 39 will be described. As shown in FIG. 1(a), the molding device 39 includes a molding unit 200, a support base 37, the Z-stage 38, and a casing 40, a sensor 41, and a control unit 42. The molding unit 200, the support base 37, the Z-stage 38, and the sensor 41 are all housed inside the casing 40. The sensor 41 is for detecting an inner environmental temperature of the casing 40 at a position vicinity of the surface of the mold 35 or the support 36. As shown in FIG. 1(b), the sensor 41 is located out of vertical alignment with the molding unit 200, the support base 37, and the Z-stage 38. The control unit 42 is for controlling ON/OFF of the sensor 41 so as to maintain the inner environmental temperature of the casing 40 at suitable temperature.

Figure 2:
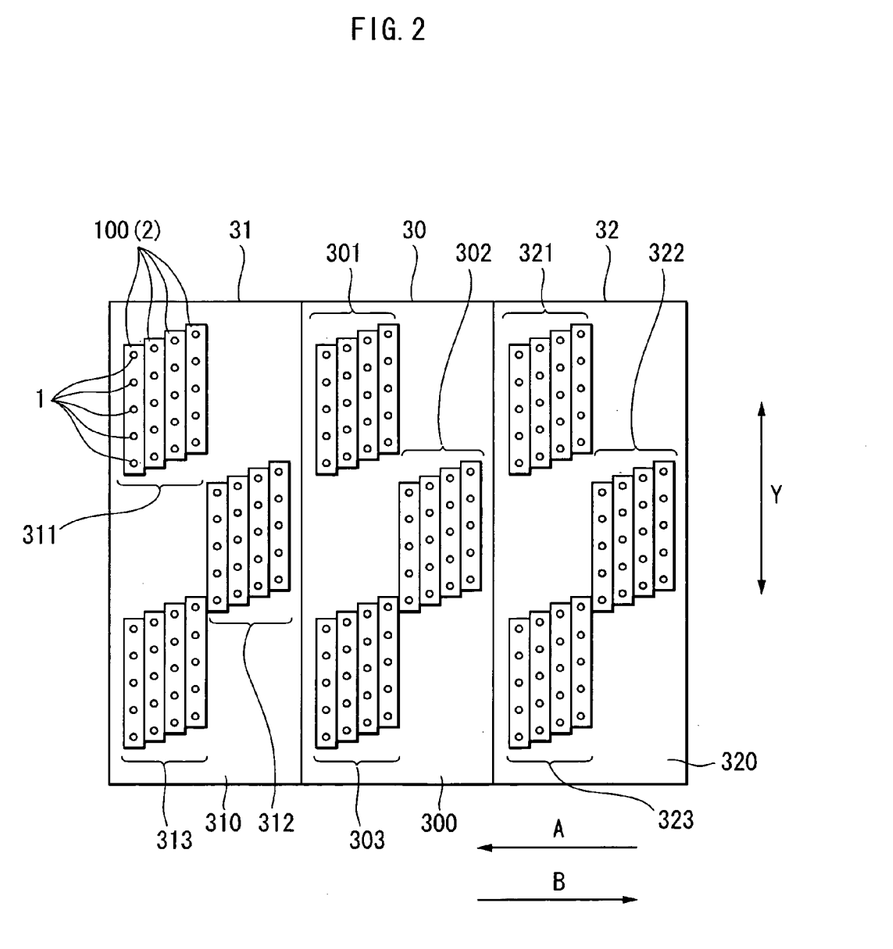
FIG. 2 is a plan view of ejection heads of the laminating molding device of FIG. 1(a)

The molding unit 200 includes the ejection heads 30, 31, and 32, and ultraviolet-ray irradiation devices 33 and 34. The ejection heads 30, 31, 32 have the same configuration, and each has a large number of linear heads 100 as shown in FIG. 2.

Figure 3:
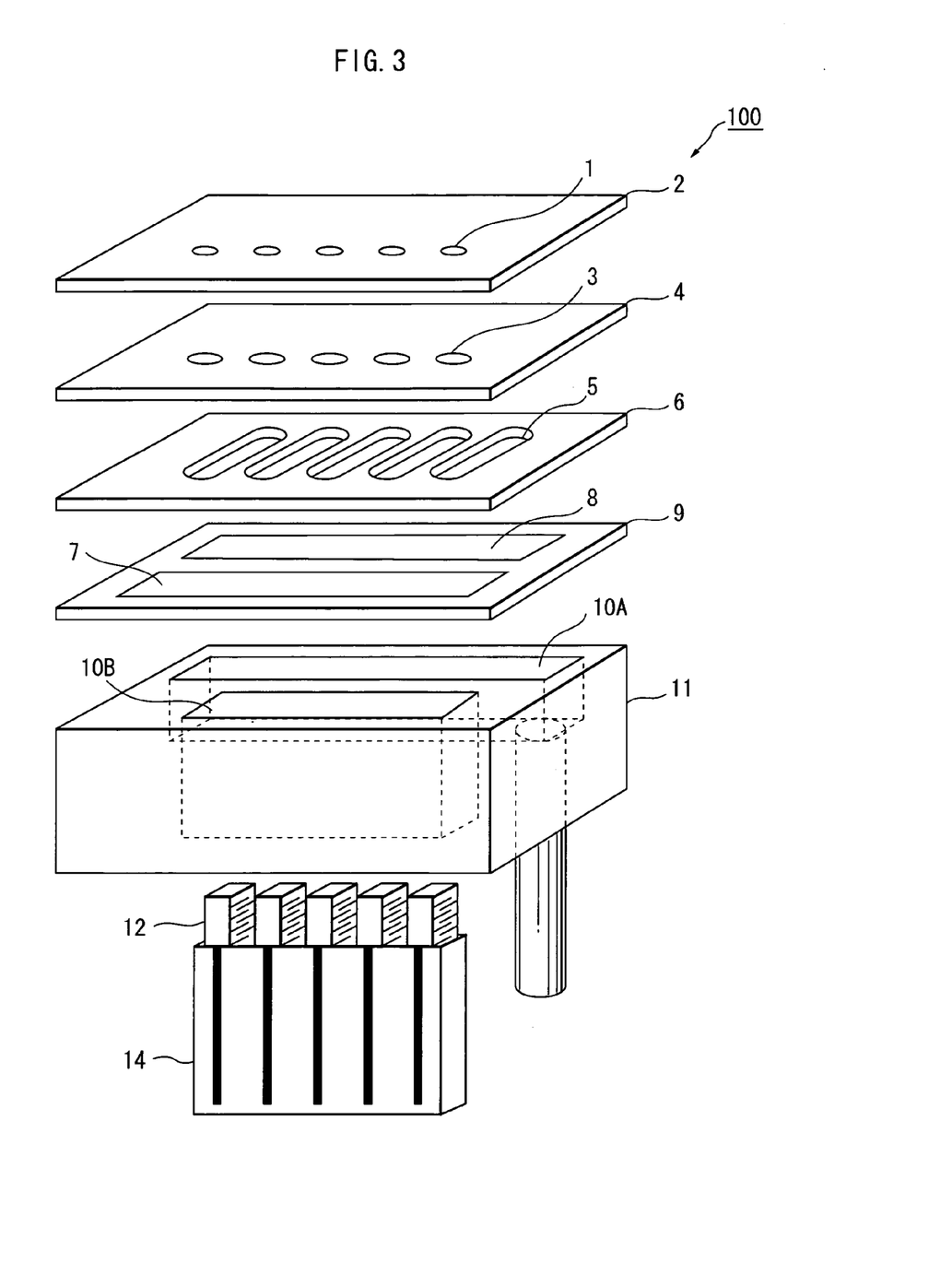
FIG. 3 is an exploded view of a linear head of the ejection heads of FIG. 2.
Figure 4:
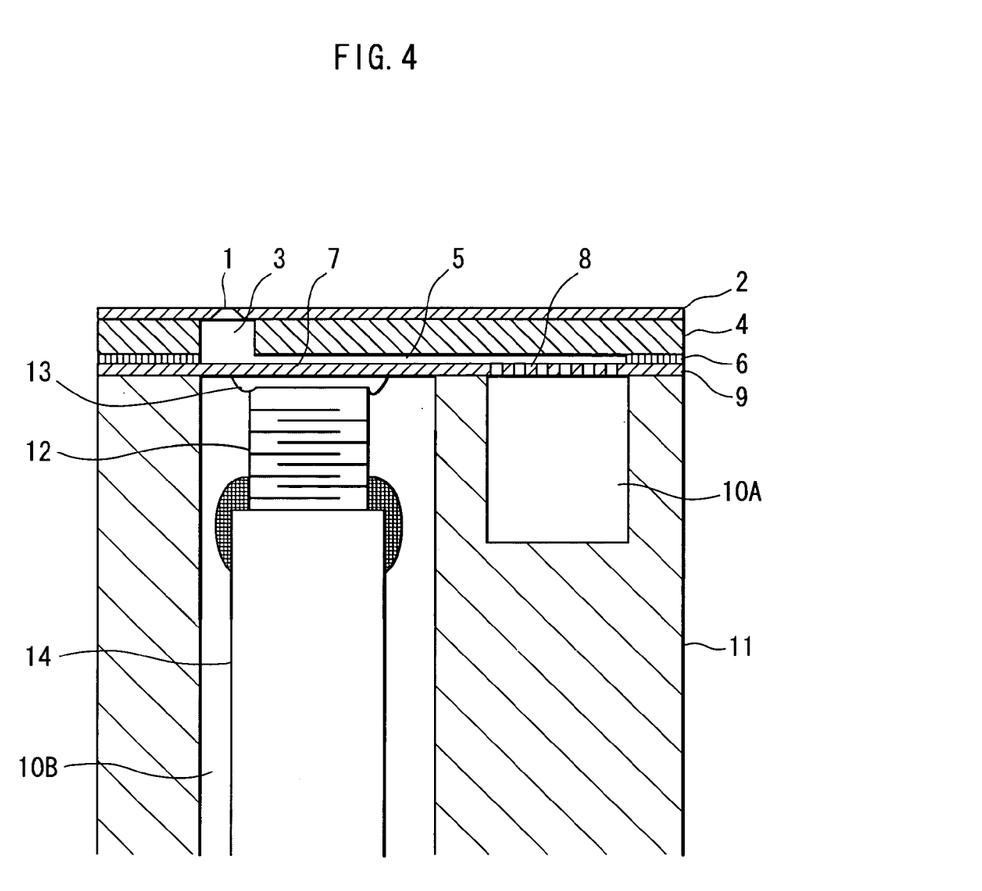
FIG. 4 is a cross-sectional view of the linear head.

As shown in FIGS. 3 and 4, each linear head 100 includes a nozzle plate 2, a pressure-chamber plate 4, a restrictor plate 6, a diaphragm 7, a diaphragm plate 9, a base 11, piezoelectric elements 12, and a substrate 14. The nozzle plate 2 is formed with five nozzles 1 aligned in a line. The pressure-chamber plate 4 is formed with pressure chambers 3 for storing ejection material (support material or mold material). The restrictor plate 6 is formed with restrictors 5 for supplying the ejection material to the respective pressure chambers 3. The diaphragm 7 provides a part of a wall defining the pressure chambers 3. The diaphragm plate 9 is provided with a filter 8. The base 11 is formed with a supply channel 10A for supplying the ejection material to the restrictors 5 and an opening 10B for receiving the piezoelectric elements 12. The piezoelectric elements 12 are attached to the diaphragm 7 at one end by adhesive 13, which is silicon adhesive or the like, and fixed to the substrate 14 at another end.

The diaphragm plate 9, the restrictor plate 6, the pressure-chamber plate 4, and the base 11 are formed of stainless material or the like. The nozzle plate 2 is formed of nickel, and the substrate 14 is formed of insulating material, such as ceramics or polyimide.

The linear head 100 is assembled in the following manner. First, the base 11, the diaphragm plate 9, the restrictor plate 6, the pressure-chamber plate 4, and the nozzle plate 2 are positioned and fixed one on the other under the pressure. At this time, epoxy adhesive is used. Next, the piezoelectric elements 12 attached to the substrate 14 are inserted into the opening 10B of the base 11, and are attached to the diaphragm 7 using the adhesive 13. Then, the base 11 is attached to a main device by screw or the like. The linear heads 100 are not clogged with a squeeze out of epoxy adhesive and remain gastight.

With this configuration, ejection material stored in an ejection material tank (not shown) is supplied through the supply channel 10A, the filter 8, the restrictors 5, and the pressure chambers 3 into the nozzles 1. Through an application and disconnection of an electrical signal to the piezoelectric elements 12, the diaphragms 7 are deformed and restored, thereby ejecting ejection-material droplets from corresponding nozzles 1 and feeding the ejection material into the pressure chambers 3.

As shown in FIG. 2, the ejection head 30 includes a fixing plate 300 and multi-head units 301, 302, and 303. Each of the multi-head units 301, 302, 303 includes four linear heads 100 fixed to the fixing plate 300. The linear heads 100 of each multi-head units 301, 302, 303 are displaced stepwise in a Y direction by a predetermined amount equivalent to a pitch of a predetermined resolution. A nozzle pitch of the nozzles 1 in the Y direction of each linear head 100 is four times the pitch of the predetermined resolution. The multi-head units 301, 302, and 303 are arranged so that the nozzle pitch in the Y direction is maintained constant.

Here, the Y direction is perpendicular to both forward and reverse directions A and B in which the molding unit 200 moves. Both are actuated through uniaxial drive mechanism (not shown).

As mentioned above, the ejection heads 31 and 32 have the same configuration as the ejection head 30. That is, the ejection head 31 includes a fixing plate 310 and multi-head units 311, 312, and 313. Each of the multi-head units 311, 312, 313 includes four linear heads 100 fixed to the fixing plate 310. The linear heads 100 of each multi-head units 311, 312, 313 are displaced stepwise in the Y direction by the predetermined amount. The multi-head units 311, 312, and 313 are arranged so that the nozzle pitch in the Y direction is maintained constant. Similarly, the ejection head 32 includes a fixing plate 320 and multi-head units 321, 322, and 323. Each of the multi-head units 321, 322, 323 includes four linear heads 100 fixed to the fixing plate 320. The linear heads 100 of each multi-head units 321, 322, 323 are displaced stepwise in the Y direction by the predetermined amount. The multi-head units 321, 322, and 323 are arranged so that the nozzle pitch in the Y direction is maintained constant.

The fixing plates 300, 310, and 320 are fixed to one another by screws (not shown). The heights of nozzle arrangements with respect to a direction perpendicular to the directions A, B, and Y (i.e., in a direction Z shown in FIG. 1(*a*)) are the same among the multi-head units 301, 302, and 303, among the multi-head units 311, 312, and 313, and among the multi-head units 321, 322, and 323.

The ejection head 30 (multi-head units 301, 302, 303) ejects the mold material. The ejection head 31 (multi-head units 311, 312, and 313) and the ejection head 32 (multi-head units 321, 322 and 323) eject the support material. Materials that can be used as the support material and materials that can be used as the mold material will be described later.

Here, in order to overcome the brittleness of the mold, it is preferable to use a mold material having as high molecular weight as possible. However, there is a limitation in viscosity, and the viscosity at the time of ejection is desirably 30 mPa·s or less. Thus, a material having very high molecular weight cannot be used as the mold material.

The sturdiness of the mold can be improved by using a low molecular weight material as the mold material and polymerizing to obtain a high molecular weight. In this case, it is preferable to use a material which is solid at room temperature for the support material and a material which is liquid at room temperature for the mold material. That is, using a material which is liquid at room temperature for the support material requires a columnar or tubular support for preventing the material from dripping. On the other hand, using a material which is solid at room temperature enables formation of a mold in single-layer or plural layers basis.

It should be noted that if a material that can be ejected at temperature below the room temperature, e.g., 10° C., for the support material, then a viscosity of the material at the room temperature is too small. This narrows the selectivity of the materials for the support material. Also, contraction in volume of such a material at the time of when the material changes from liquid phase to solid phase is generally large, resulting in degradation of dimensional accuracy of a mold.

Similarly, if a material that can be ejected at temperature below the room temperature, e.g., 10° C., for the mold material, then a viscosity of the material at the room temperature is too small. This narrows the selectivity of the materials for the mold material. Also, a mold formed of such a material is generally poor in strength and sturdiness. Further, if a material that solidified when irradiated with an ultraviolet ray, then reaction rate greatly slows down at lower temperature, and also the material greatly contracts when solidified.

For this reason, in the present embodiment, a solid ink which is solid at room temperature is used as the support material, and a photo-curing resin ink which is liquid at room temperature is used as the mold material.

The ultraviolet-ray irradiation devices 33 and 34 are disposed to the left and right of the ejection heads 31 and 32, respectively. The ultraviolet-ray irradiation devices 33 and 34 irradiate ultraviolet rays for curing and polymerizing the photo-curing resin ink ejected from the ejection head 30.

In FIG. 1(*a*), the molding device 39 ejects the mold material from the ejection head 30 and the support material from the nozzle heads 31 and 32, and cures the mold material using the ultraviolet-ray irradiation devices 33 and 34.

More specifically, when the molding unit 200 moves in the direction A, the solid ink is ejected from the ejection head 31, and the photo-curing resin ink is ejected from the ejection head 30. Thus ejected photo-curing resin ink is cured by the ultraviolet-ray irradiation device 34. In this manner, one-layer of a support 36 and a mold 35 are formed on the mold support base 37. At this time, the nozzle head 32 and the ultraviolet-ray irradiation device 33 could supplementarily be used.

On the other hand, when the molding unit 200 moves in the direction B, the solid ink is ejected from the nozzle head 32, and the photo-curing resin ink is ejected from the ejection head 30. By using the ultraviolet-ray irradiation device 33, the ejected photo-curing resin ink is cured. In this manner, one-layer of the support 36 and the mold 35 are formed on the mold support base 37. At this time, the ejection head 31 and the ultraviolet-ray irradiation device 34 could supplementarily be used.

To maintain a predetermined distance of the molding unit 200 from the support 36 and the mold 35, the Z-stage 38 is lowered by a predetermined amount each time the one-layer of the support 36 and the mold 35 are formed in the above-described manner. It should be noted that ejection timings of the ink is controlled so that ink is ejected onto prescribed positions at a prescribed resolution.

By repeating the above operations, the support 36 is formed from the solid ink ejected from the ejection head 31 and 32. At the same time, the photo-curing resin ink is ejected from the ejection head 30 into a groove or a weir of the support 36 and polymerized and cured by the ultraviolet rays irradiated from the ultraviolet-ray irradiation devices 33 and 34, thereby producing the mold 35.

As described above, because the photo-curing resin ink is ejected in the groove or weir of the support 36, there is no danger of "dripping" of the mold material ink even if the mold material is liquid at room temperature. Therefore, a wide range of photo-curing resins and thermo-setting resins can be used as the mold material. Further, because the ejection heads 31 and 32 are located at both sides of the ejection head 30, the photo-curing resin ink can be always ejected after the ejection of the solid ink both while the molding unit 200 is moving in the forward direction A and while the molding unit 200 is moving in the reverse direction B. Therefore, the support material and the mold material can be ejected both in the forward and reverse directions A and B, improving the laminating molding speed.

Further, because there are two ejection heads 31, 32 for the support material, even if one or more of the nozzles 1 is clogged in one of the ejection heads 31, 32, an alternative ejection is possible using corresponding one or more of the nozzles 1 in the another ejection head 31, 32, providing a control device for detecting the clogged nozzle 1 and performing necessary control operations is provided.

Moreover, because the ejection heads 31, 32 for the support material are located between the ejection head 30 for the mold material and respective ultraviolet-ray irradiation devices 33, 34, leakage light or reflected light hardly irradiates the ejection head 30, so that clogging of the nozzles 1 of the ejection head 30 can be prevented.

Because heat generated by the ultraviolet-rays irradiation device 33, 34 (active energy ray irradiation devices) when the ultraviolet-rays irradiation device 33, 34 irradiate the ultraviolet ray smoothes the surface of the laminated support material which has been ejected from the ejection head 31, 32, and as a result, dimensional stability of the mold 35 is enhanced. If the ultraviolet-ray irradiation devices 33 and 34 are supplementarily used while the molding unit 200 moves in the directions A and B, respectively, as described above, the dimensional stability of the mold 35 is further enhanced. Because a sufficient dimensional stability of the mold 35 is secured without performing the smoothing process, time required for smoothing process can be omitted, enabling high speed laminating molding.

Figure 5:
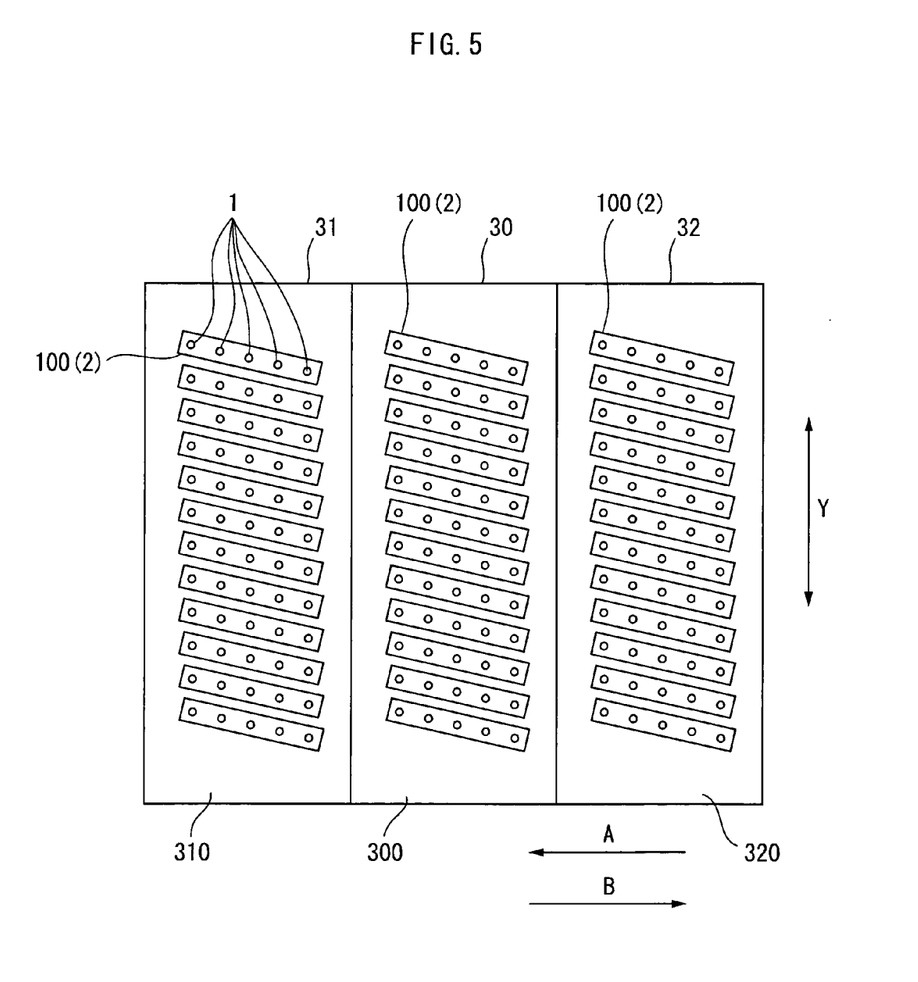
FIG. 5 is a plan view of another example of ejection heads according to the embodiment of the present invention.

Although in the above-describe embodiment the ejection heads 30, 31, 32 each has the linear-head arrangement shown in FIG. 4, each ejection head 30, 31, 32 could have the linear-head arrangement shown in FIG. 5 instead.

That is, the plurality of linear heads 100 are fixed slant with respect to the directions A and B on each of the fixing plates 300, 301, and 302 so that the nozzle pitch with respect to the Y direction becomes a prescribed resolution.

With this linear-head arrangement, the mounting density of the linear heads 100 (nozzle plates 2) on the fixing plates 300, 310, and 320 can be increased, and at the same time, an ejection width in the Y direction can be increased. Therefore, a desired ejection width can be achieved using less nozzle plates 100.

Next, a molding device 39A according to a modification of the embodiment will be described with reference to FIG. 6. The molding device 39A has the similar configuration as the above-described molding device 39 except in that the ultraviolet-ray irradiation devices 33 and 34 are disposed between the ejection heads 30 and 31 and between the ejection heads 30 and 32, respectively. In the molding device 39A, the ultraviolet-ray irradiation devices 33 and 34 are both used while a molding unit 200A moves in the forward direction A and also in the reverse direction B.

With this configuration, heat generated by the ultraviolet-rays irradiation device 33, 34 (active energy ray irradiation devices) when the ultraviolet-rays irradiation device 33, 34 irradiate the ultraviolet ray smoothes the surface of the laminated support material which has been ejected from the ejection head 31, 32, and as a result, dimensional stability of the mold 35 is enhanced. Because a sufficient dimensional stability of the mold 35 is secured without performing the smoothing process, time required for smoothing process can be omitted, enabling high speed laminating molding. Note that it is possible to perform the smoothing process for further improving the preciseness of the mold 35.

By controlling an inner environmental temperature of the molding device 39 (39A) during the laminating molding to a range from a temperature 30° C. lower than the melting point of the support materials to a temperature 5° C. lower than the melting point of the support material, warp deformation of the support 36 due to volume shrinkage accompanying a temperature change of the support material can be suppressed, thus allowing an enhancement of the dimensional stability of the mold 35. Also, smooth surface of the support 36 can be obtained without performing any special finishing. If the inner environmental temperature is below a temperature 30° C. than the melting point of the support material, then deterioration of dimensional stability due to warp deformation is invoked, and the surface lacks in smoothness. On the other hand, if the inner environmental temperature is above a temperature 5° C. lower than the melting point, then the support material may partially deforms depending on the shape of the mold 35, causing deterioration of dimensional stability of the mold 35.

That is, the inner environmental temperature of the molding device 39 (39A) during the laminating molding should be controlled to a range from a temperature 30° C. lower than the melting point of the support material to a temperature 5° C. lower than the melting point of the support material. However, it is preferable to control the inner environmental temperature in a range from a temperature 25° C. lower than the melting point of the support material to a temperature 10° C. lower than the melting point of the support material, and it is more preferable to control the same in a range from a temperature 20° C. lower than the melting point of the support material to a temperature 10° C. lower than the melting point of the support material, for achieving high dimensional stability of the molding mold 35 regardless of the shape of the mold 35.

Figure 6:
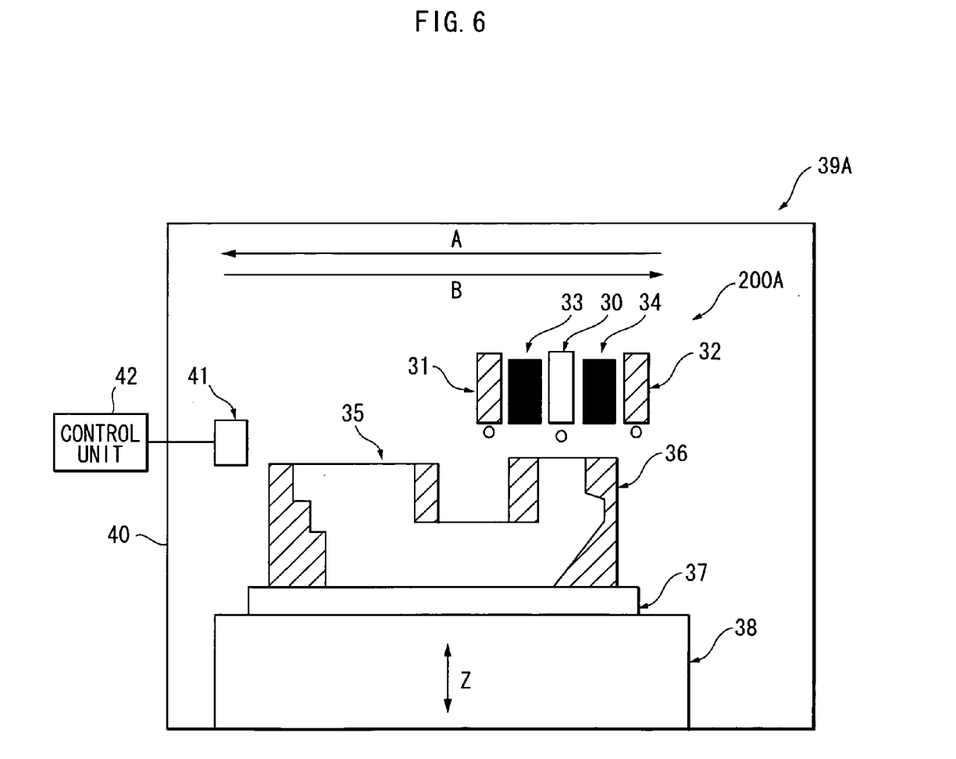
FIG. 6 is a schematic view of a laminating molding device according to a modification of the embodiment.

Following experiments have been conducted using the molding device 39A shown in FIG. 6.

Experiment 1

A total of 300 g containing 10 parts by weight of urethane acrylate (trade name: DIABEAM UK6038, available from Mitsubishi Rayon Co., Ltd.) and 90 parts by weight of neopentyl glycol hydroxypivalate ester di(meth)acrylate (trade name: KAYARAD MANDA, available from Nippon Kayaku Co., Ltd.) as a mold material, 3 parts by weight of a photo-polymerization initiator (trade name: IRGACURE 1700, available from Ciba Specialty Chemicals), and 2 parts by weight of a blue pigment (trade name: Lionel Blue 7400G, available from TOYO INK MFG. CO., LTD.) as a colorant was dispersed until a uniform mixture was obtained using a homogenizer (trade name: HG30, manufactured by Hitachi Koki Co., Ltd.) at a stirring speed of 2,000 rpm. Successively, the resultant mixture was passed through a filter to remove impurities or the like, thereby obtaining a uniform ink composition for mold. The viscosity of the ink was 9.5 mPa·s, and the surface tension of the ink was 32.5 mN/m. The viscosity of the ink was measured using a rotational viscometer (ELD model, manufactured by TOKIMEC Inc.), and the surface tension was measured using an automated surface tension balance (CVBP-Z model, manufactured by Kyowa Interface Science Co., Ltd.). Measuring temperatures thereof were both 25° C.

A total of 300 g containing 50 parts by weight of a carnauba wax (trade name: deodorized purified carnauba wax No. 1, available from CERARICA NODA Co., Ltd.) and 50 parts by weight of esteramide (tradename: Kawaslip SA, available from Kawaken Fine Chemicals Co., Ltd.) as a support material, and 3 parts by weight of a black pigment (trade name: MA77, available from Mitsubishi Chemical Corporation) as a colorant was dispersed until a uniform mixture was obtained using a homogenizer (trade name: HG30, manufactured by Hitachi Koki Co., Ltd.) at a stirring speed of 2,000 rpm. Successively, the resultant mixture was passed through a filter to remove impurities or the like, thereby obtaining a uniform ink composition for a support. The viscosity of the ink was 11.0 mPa·s, and the surface tension was 20.0 mN/m. Both were measured at an ejection temperature of 130° C. Melting point was measured using a micro melting point device MP-S3, manufactured by Yanagimoto Manufacturing. Co. About 3 mg of the ink was placed onto a sample holder and was heated at a temperature increase rate of 2° C./minutes. Generally, a temperature from which the ink begins to melt and to which the ink completes melting is defined as a melting point. However, the melting point indicates a temperature from which the ink began to melt in this embodiment. The melting point of the ink was 75° C.

Using thus obtained mold material and support material, a mold was formed while controlling an inner environment temperature of the molding device 39A to 50° C. and curing the mold material by irradiating the mold material with 350 mJ/cm$^2$ of light using the ultraviolet-ray irradiation devices 33 and 34 (SP5-250 DB, manufactured by Ushio Inc.). The formed mold had no warp or partial deformation, and had a smooth surface.

Experiment 2

Using the same mold material and support material as that used in the experiment 1, a mold was produced while controlling the inner temperature of the molding device 39A to 70° C. and curing the mold material by irradiating the mold material with 250 mJ/cm$^2$ of light using the ultraviolet-ray irradiation devices 33, 34 (SP5-250 DB, manufactured by Ushio Inc.). The formed mold had no warp or partial deformation, and had a smooth surface.

Experiment 3

Using the same mold material and support material as that used in the experiment 1, a mold was formed while controlling the inner temperature of the molding device 39A to 45° C. and curing the mold material by irradiating the mold material with 350 mJ/cm$^2$ of light using the ultraviolet-ray irradiation devices 33, 34 (SP5-250 DB, manufactured by Ushio Inc.). The formed mold had no warp or partial deformation. However, the surface slightly lacked smoothness.

Experiment 4

Using the same mold material and support material as that used in the experiment 1, a mold was formed while controlling the inner temperature of the molding device 39A to 55° C. and curing the mold material by irradiating the mold material with 300 mJ/cm$^2$ of light using the ultraviolet-ray irradiation devices 33, 34 (SP5-250 DB, manufactured by Ushio Inc.). The formed mold had no warp or partial deformation, and had a smooth surface state.

Experiment 5

Using the same mold material and support material as that used in the experiment 1, a mold was formed while controlling the inner temperature of the molding device 39A to 60° C. and curing the mold material by irradiating the mold material with 300 mJ/cm$^2$ of light using the ultraviolet-ray irradiation devices 33, 34 (SP5-250 DB, manufactured by Ushio Inc.). The formed mold had no warp or partial deformation, and had a smooth surface.

Experiment 6

Using the same mold material and support material as that used in the experiment 1, a mold was formed while controlling the inner temperature of the molding device 39A to 65° C. and curing the mold material by irradiating the mold material with 300 mJ/cm$^2$ of light using the ultraviolet-ray irradiation devices 33, 34 (SP5-250 DB, manufactured by Ushio Inc.). The formed mold had no warp or partial deformation, and had a smooth surface.

Comparative Experiment 1

Using the same mold material and support material as that used in the experiments 1, a molding was formed while controlling the inner temperature of the molding device 39A to 71° C. and curing the mold material by irradiating the mold material with 300 mJ/cm$^2$ of light using the ultraviolet-ray irradiation devices 33, 34 (SP5-250 DB, manufactured by Ushio Inc.). The support material partially deformed depending on the shape of the mold, and dimensional stability of the mold was inferior.

Comparative Experiment 2

Using the same mold material and support material as that used in the experiment 1, a mold was formed while controlling the inner temperature of the molding device 39A to 44° C. and curing the mold material by irradiating the mold material with 300 mJ/cm$^2$ of light using the ultraviolet-ray irradiation devices 33, 34 (SP5-250 DB, manufactured by Ushio Inc.). The formed mold had slight deformation or dimensional distortion in an end portion and an elongated portion. The surface was not smooth.

As described above, the present invention can provide a less-expensive inkjet-type three-dimensional laminating molding device that produces highly-precise and hardly-breakable mold at high speed.

When a material that is solid at room temperature is used as the support material, each dot of the material may solidify individually, resulting in lack of smoothness of support layers. However, using a material that melts or deforms when irradiated with an active energy ray as the support material improves the smoothness of each support layer during laminating molding process. This in turn secures the strength of a mold.

If the mold material and the support material have different colors, it is easily determined whether or not the support material remains when removing the support material. By adding a black dye, a black pigment, or a dark-colored colorant to the support material, an absorption efficiency of the active energy ray increases, thereby enabling further improvement of smoothness of each of the layers during laminating molding.

As the support material, one or more components selected from fatty amide, polyester, polyvinyl acetate, a silicone resin, a coumarone resin, fatty ester, glyceride, wax, and the like can be used. The melting points of those support materials are about 70 to 90° C. Therefore, the linear heads 100 and a tank (not shown) for storing the support material must be stably maintained at a high temperature of 100° C. or higher. Further, it is important for the support material to excel in thermal resistance. Because these support materials solidify instantaneously when adhere to a medium or the like after being ejected from the nozzles, drying process after the ejection is unnecessary, so that high speed laminating molding is possible. Further, because solvent of those support material does not evaporate, those support materials are good for the environment.

Examples of the fatty amide include monoamide, bisamide, tetraamide, polyamide, and esteramide. For the monoamide, one or a combination of two or more of lauramide, stearamide, oleamide, erucamide, ricinoleamide, palmitamide, behenamide, and brassidamide can be used. N-substituted fatty amide may be used. In this case, one or a combination of two or more of N,N'-hydroxystearamide, N,N1-ethylenebisoleamide, N,N'-xylenebisstearamide, monomethylol stearamide, N-oleyl stearamide, N-stearyl stearamide, N-oleyl palmitamide, N-stearyl erucamide, N,N'-dioleyl adipamide, N,N'-dioleyl sebacamide, N,N'-distearyl isophthalamide, and 2-steramide ester stearate can be used.

For the bisamide, N,N'-ethylenebisoleamide, N,N'-xylenebisstearamide, or the like can be used. For the tetramide, UNIREZ 2224, UNIREZ 2970 (both available from Union Camp Chemicals Ltd.), or the like can be used. For the polyamide, SYLVAMIDE-5, (available from Arizona Chemical Corporation), DPX 335-10, DPX H-415, DPX 335-11, DPX 830, DPX 850, DPX 925, DPX 927, DPX 1160, DPX 1163, DPX 1175, DPX 1196, DPX 1358, Versamid 711, Versamid 725, Versamid 930, Versamid 940, Versalon 1117, Versalon 1138, Versalon 1300(available from Henkel Corporation), Tohmide 391, Tohmide 393, Tohmide 394, Tohmide 395, Tohmide 397, Tohmide 509, Tohmide 535, Tohmide 558, Tohmide 560, Tohmide 1310, Tohmide 1396, Tohmide 90, Tohmide 92 (available from Fuji Kasei Kogyo Co., Ltd.), or the like can be used. For the esteramide, fatty esteramides, such as stearic esteramic, is typical, and CPH-380N (available from CP Hal), Kawaslip SA (available from Kawaken Fine Chemicals Co., Ltd.), or the like can be used.

For the polyester, KTR2150 (available from Kao Corporation) can be used. For the polyvinyl acetate, AC401 AC540, or AC580 (available from Allied Chemical) can be used. For the silicone resin, SILICONE SH6018 (available from Toray Silicone Co., Ltd.), SILICONE KR215, SILICONE KR216, or SILICONE KR220 (available from Shin-Etsu Chemical Co., Ltd.) can be used. For the coumarone resin, ESCURON G-90 (available from Nippon Steel Chemical Co., Ltd.) can be used.

A monovalent or polyvalent alcohol fatty ester is preferable for the fatty ester. Examples of fatty esters that can be used include sorbitan monopalmitate, sorbitan monostearate, sorbitan monobehenate, polyethylene glycol monostearate, polyethylene glycol distearate, polypylene glycol monostearate, and ethylene glycol distearate. Specific examples thereof that can be used include RHEODOL SP-S10, RHEODOL SP-S30, RHEODOL SA10, EMASOL P-10, EMASOL S-10, EMASOL S-20, EMASOL B, RHEODOL SUPER SP-S10, EMANON 3199, EMANON 3299, EXCEPARL PE-MS (all available from Kao Corporation) Unister M9676, and Unister M2222SL (available from NOF Corporation).

In addition, higher alcohol esters, such as myricyl cerotate, ceryl cerotate, ceryl montanate, myricyl palmitate, myricyl stearate, cetyl palmitate, and cetyl stearate, can be used.

The glycerides can be selected from monoglyceride stearate, monoglyceride palmitate, monoglyceride oleate, monoglyceride behenate, and the like. Specific examples thereof include RHEODOL MS-50, RHEODOL MS-60, RHEODOL MS-165, RHEODOL Mo-60, and EXCEPARL G-MB (all available from Kao Corporation).

The wax can be selected from a petroleum wax, such as a paraffin wax, a microcrystalline wax, and a Fischer-Tropsch wax, a vegetable wax, such as a candelilla wax and a carnauba wax, a special ester wax, and a polyethylene wax. Specific examples thereof include deodorized purified carnauba wax No. 1, purified candelilla wax No. 1 (all available from CERARICA NODA Co., Ltd.), Syncrowax ERL-C, Synrowax HR-C (both available from Croda Japan KK), and KF2 (available from Kawaken Fine Chemicals Co., Ltd.). Examples of special ester waxes that can be used include EXCEPARL DS-C2 (available from Kao Corporation), Kawaslip-L, and Kawaslip-R (both available from Kawaken Fine Chemicals Co., Ltd.).

Further, an aliphatic saturated hydrocarbon resin, a rosin resin, a hydrocarbon resin, an amide resin, and a high molecular-weight resin of an acrylate and methacrylate polymer, a styrene polymer, an ethylene-vinyl acetate copolymer, polyketone, or the like can be added as well.

Various surface treatment agents, surfactants, viscosity modifiers, tackifier, antioxidants, age resistors, crosslinking promoters, ultraviolet absorbers, plasticizers, preservatives, and dispersers are preferably mixed to express the functionality.

As a colorant, dyes and pigments which dissolve or stably disperse in the support materials and which are excel in thermal stability are suitable. Solvent Dye is desirable, but there is no specific limitation. Further, two or more kinds of colorants can be mixed appropriately for color adjustment or the like.

Examples of specific dyes are listed below.

<Magenta dye> MS Magenta VP, MS Magenta HM-1450, MS Magenta Hso-147 (Mitsui Toatsu Chemicals, Inc.), AIZEN SOT Red series, SPIRON Red GEHSPECIAL (Hodogaya Chemical Co., Ltd.), MACROLEX ROT 5B (Bayer Japan Ltd), KAYASET Red B, KAYASET Red 130, KAYASET Red 802 (Nippon Kayaku Co., Ltd.), ROSE BENGAL (Daiwa Kasei Co., Ltd.), DIARESIN Red K (Mitsubishi Chemical Corporation), Oil Red (BASF Japan Ltd.), Oil Pink330 (Chuo Synthetic Chemical Co., Ltd).

<Cyan dye> MS Cyan HM-1238, MS Cyan VPG (Mitsui Toatsu Chemicals, Inc.), AIZEN SOT Blue-4 (Hodogaya Chemical Co., Ltd.), MACROLEX Blue RR (Bayer Japan Ltd), KAYASET Blue N, KAYASET Blue 814 (Nippon Kayaku Co., Ltd.), DAIWA Blue 7000, Oleosol Fast Blue GL (Daiwa Kasei Co., Ltd.), DIARESINBlue P (Mitsubishi Chemical Corporation), SUDAN Blue 670, NEOPEN Blue 808, ZAPON Blue 806 (BASF JAPAN LTD.).

<Black dye> MS BLACK VPC (Mitsui Toatsu Chemicals, Inc.), AIZEN SOT BLACK-1, AIZEN SOT BLACK-5 (Hodogaya Chemical Co., Ltd.), RESOLIN BLACK BS (Bayer Japan Ltd), KAYASETBLACK A-N (Nippon Kayaku Co., Ltd.), DAIWA BLACK MSC (Daiwa Kasei Co., Ltd.), HSB-202 (Mitsubishi Chemical Corporation), NEP- TUNE BLACK X60, NEOPEN BLACK X58 (BASF JAPAN LTD.), Oleosol Fast BLACK RL (Taoka Chemical Co., Ltd.), Chuo BLACK80, Chuo BLACK80-15 (Chuo Synthetic Chemical Co., Ltd)

As a pigment, various organic or inorganic pigments can be used. Examples include Chromofine Magenta 6880, 6891N, 6790, 6887, Chromofine Red 6830, Chromofine Blue HS-3, 5187, 5197, 5085N, SR-4937, 4933GN-EP, 5214, 5221, 5000P, Chromofine Black A-1103, Seikafast Red 8040, CA120, LR-116, 1531B, 8060R, ZAW-262, 1537B, 4R-4016, ZA-215, Seikalight violet B800, 7805, Seikalight Blue C718, A612, Cyanine Blue 4933M, 4933GN-EP, 4940, 4973 (Dainichiseika Color & Chemicals Mfg.Co., Ltd.), KET Red 301, 302, 303, 304, 305, 306, 307, 308, 309, 310, 336, 337, 338, 346, KET Blue 101, 102, 103, 104, 105, 106, 111, 118, 124 (Dainippon Ink And Chemicals, Incorporated), Colortex Redll5, 116, D3B, H-1024, Colortex Violet600, Pigment Red 122, Colortex Blue516, 517, 518, 519, A818, P-908, Colortex Black 702, U905 (Sanyo Color Works, Ltd.), Lionol Blue FG7330, FG7350, FG7400G, FG7405G, (Toyo Ink MFG. Co., Ltd.), carbon black #2600, #2400, #2350, #2200, #1000, #990, #980, #970, #960, #950, #850, MCF88, #750, #650, MA600, MA7, MA8, MA11, MA100, MA100R, MA77, #52, #50, #47, #45, #45L, #40, #33, #32, #30, #25, #20, #10, #44, CF9 (Mitsubishi Chemical Corporation).

The mold material is a material which cures by active energy ray irradiation, heating, or the like, for example, is an active energy ray-curing or thermosetting compound, and is preferably liquid at room temperature from the view of preventing nozzle clogging.

The active energy ray-curing compound is a compound which polymerizes through a radical polymerization or a cationic polymerization by irradiating the active energy ray. A compound containing an ethylene unsaturated group as the compound that polymerizes through radical polymerization, and a compound containing an aliphatic epoxy group or an oxetane ring as the compound that polymerizes through cationic polymerization are suitably used.

Examples of a photo-curing resin monomer used in the mold material is preferably a resin monomer with relatively low viscosity which can polymerize radically and contains, in a molecular structure, an unsaturated double bond. Preferable examples thereof include a monofunctional group, such as 2-ethylhexyl(meth)acrylate (EHA), 2-hydroxyethyl (meth)acrylate (HEA), 2-hydroxypropyl(meth)acrylate (HPA), caprolactone-modified tetrahydrofurfuryl(meth) acrylate, isobonyl(meth)acrylate, 3-methoxybutyl(meth) acrylate, tetrahydrofurfuryl(meth)acrylate, lauryl(meth) acrylate, 2-phenoxyethyl(meth)acrylate, isodecyl(meth) acrylate, isooctyl(meth)acrylate, tridecyl(meth)acrylate, caprolactone (meth)acrylate, and ethoxylated nonylphenol (meth)acrylate, a bifunctional group, such as tripropylene glycol di(meth)acrylate, triethylene glycol di(meth)acrylate, tetraethylene glycol di(meth)acrylate, polypropylene glycol di(meth)acrylate, neopentyl glycol hydroxy pivalate ester di(meth)acrylate (MANDA), hydroxy pivalate neopentyl glycol ester di(meth)acrylate (HPNDA), 1,3-butanediol di(meth)acrylate (BGDA), 1,4-butanediol di(meth)acrylate (BUDA), 1,6-hexanediol di(meth)acrylate (HDDA), 1,9-nonanediol di(meth)acrylate, diethylene glycol di(meth) acrylate (DEGDA), neopentyl glycol di(meth)acrylate (NPGDA), tripropylene glycol di(meth)acrylate (TPGDA), caprolactone-modified hydroxy pivalate neopentyl glycol ester di(meth)acrylate, propoxylated pentyl glycol di(meth) acrylate, ethoxy-modified bisphenol A di(meth)acrylate, polyethylene glycol 200 di(meth)acrylate, and polyethylene 400 di(meth)acrylate, and a polyfunctional group, such as trimethylolpropane tri(meth)acrylate (TMPTA), pentaerythritol tri(meth)acrylate (PETA), dipentaerythritol hexa(meth) acrylate (DPHA), triallyl isocyanate, ε-caprolactone-modified dipentaerythritol (meth)acrylate, tris(2-hydroxyethyl) isocyanurate tri(meth)acrylate, ethoxylated trimethylol propane tri(meth)acrylate, propoxylated trimethylol propane tri(meth)acrylate, propoxylated glyceryl tri(meth)acrylate, pentaerythritol tetra(meth)acrylate, ditrimethylol propane tetra(meth)acrylate, dipentaerythritol hydroxypenta(meth) acrylate, ethoxylated pentaerythritol tetra(meth)acrylate, and penta(metha)acrylate ester.

Examples include KAYARAD TC-110S, KAYARAD R-128H, KAYARAD R-526, KAYARAD NPGDA, KAYARAD PEG400DA, KAYARAD MANDA, KAYARAD R-167, KAYARAD HX-220, KAYARAD HX-620, KAYARAD R-551, KAYARAD R-712, KAYARAD R-604, KAYARAD R-684, KAYARAD GPO, KAYARAD TMPTA, KAYARAD THE-330, KAYARAD TPA-320, KAYARADTPA-330, KAYARAD PET-30, KAYARAD RP-1040, KAYARAD T-1420, KAYARAD DPHA, KAYARAD DPHA-2C, KAYARAD D-310, KAYARAD D-330, KAYARAD DPCA-20, KAYARAD-DPCA-30, KAYARAD DPCA-60, KAYARAD DPCA-120, KAYARAD DN-0075, KAYARAD DN-2475, KAYAMER PM-2, KAYAMER PM-21, KS series HDDA, TPGDA, TMPTA, SR series 256, 257, 285, 335, 339A, 395, 440, 495, 504, 111, 212, 213, 230, 259, 268, 272, 344, 349, 601, 602, 610, 9003, 368, 415, 444, 454, 492, 499, 502, 9020, 9035, 295, 355, 399E494, 9041203, 208, 242, 313, 604, 205, 206, 209, 210, 214, 231E239, 248, 252, 297, 348, 365C, 480, 9036, 350 (Nippon Kayaku Co., Ltd.), BEAM SET 770 (Arakawa Chemical Industries, Ltd.).

As a photo-polymerizable prepolymer, a photo-polymerizable prepolymer used for production of ultraviolet light-curing resin can be used. Examples of the prepolymer that can be used without restriction may include a polyester resin, an acrylate resin, an epoxy resin, a urethane resin, an alkyd resin, an ether resin, and an acrylate or methacrylate of a polyvalent alcohol or the like. Further, a water-soluble resin and an emulsion-type photo-curing resin can also be used. Specific examples thereof include polyester (meth) acrylate, bisphenol epoxy (meth)acrylate, bisphenol A epoxy (meth)acrylate, propylene oxide-modified bisphenol A epoxy (meth)acrylate, alkali-soluble epoxy (meth)acrylate, acrylate-modified epoxy (meth)acrylate, phosphate-modified epoxy (meth)acrylate, polycarbonate urethane (meth) acrylate, polyester urethane (meth)acrylate, cycloaliphatic urethane (meth)acrylate, aliphatic urethane (meth)acrylate, polybutadiene (meth)acrylate, and polystyryl (meth)acrylate.

Examples include: Diabeam UK6105, Diabeam UK6038, Diabeam UK6055, Diabeam UK6063, Diabeam UK4203 (Mitsubishi Rayon Co., Ltd.), Olestar Ra1574 (Mitsui Chemicals, Inc.), KAYARAD UX series 2201, 2301, 3204, 3301, 4101, 6101, 7101, 8101, KAYARAD R&EX series, 011, 300, 130, 190, 2320, 205, 131, 146, 280, KAYARAD MAX series, 1100, 2100, 2101, 2102, 2203, 2104, 3100, 3101, 3510, 3661 (Nippon Kayaku Co., Ltd.), BEAM SET 700, 710, 720, 750, 502H, 504H, 505A-6, 510, 550B, 551B, 575, 261, 265, 267, 259, 255, 271, 243, 101, 102, 115, 207TS, 575CB, AQ-7, AQ-9, AQ-11, EM-90, EM-92 (Arakawa Chemical Industries, Ltd.), 0304TB, 0401TA, 0403KA, 0404EA, 0404TB, 0502TI0502TC, 102A, 103A, 103B, 104A, 1312MA, 1403EA, 1422TM, 1428TA, 1438MG, 1551 MB, IBR-305, 1FC-507, 1SM-012, 1AN-202, 1ST-307, 1AP-201, 1PA-202, 1XV-003, 1 KW-430, 1

KW-501, 4501TA, 4502MA, 4503MX, 4517 MB, 4512MA, 4523TI, 4537MA, 4557 MB, 6501MA, 6508MG, 6513MG, 6416MA, 6421MA, 6560MA, 6614MA, 717-1, 856-5, QT701-45, 6522MA, 6479MA, 6519 MB, 6535MA, 724-65A, 824-65, 6540MA, 6RI-350, 6TH-419, 6HB-601, 6543 MB, 6AZ-162, 6AZ-309, 6AZ-215, 6544MA, 6AT-203B, 6BF-203, 6AT-113, 6HY316, 6RL-505, 7408MA, 7501TE, 7511MA, 7505TC, 7529MA, MT408-13, MT408-15, MT408-42, 7CJ-601, 7PN-302, 7541 MB, 7RZ-011, 7613MA, 8DL-100, 8AZ-103, 5YD-420, 9504MNS, Acryt WEM-202U, 030U, 321U, 306U, 162, WBR-183U, 601U, 401U, 3DR-057, 829, 828 (TAISEI CHEMICAL INDUSTRIES, LTD.).

Further, as a photo-polymerization initiator, an arbitrary substance which forms radicals through emission of light (in particular, ultraviolet light of wavelength 220 nm to 400 nm) can be used. Specific examples thereof include acetophenone, 2,2-diethoxy acetophenone, p-dimethylamino acetophenone, benzophenone, 2-chlorobenzophenone, p,p'-dichloro benzophenone, p,p-bisdiethylamino benzophenone, Michler's ketone, benzyl, benzoin, benzoin methyl ether, benzoin ethyl ether, benzoin isopropyl ether, benzoin-n-propyl ether, benzoin isobutyl ether, benzoin-n-butyl ether, benzyl methyl ketal, thioxanthone, 2-chloro thioxanthone, 2-hydroxy-2-methyl-1-phenyl-1-one, 1-(4-isopropylphenyl)2-hydroxy-2-methylpropane-1-one, methyl benzoyl formate, 1-hydroxycyclohexyl phenyl ketone, azobisisobutyronitrile, benzoyl peroxide, and di-tert-butylperoxide. One kind of those photo-polymerization initiators can be used alone, or several kinds thereof can be used in combination.

A sensitizer can also be used for preventing a decrease of curing speed during photoirradiation (in particular, ultraviolet light) caused by pigment in ink absorbing or shielding a light (in particular, ultraviolet light). Examples of the sensitizer include: an aliphatic amine; a cyclic amine compound, such as an amine containing an aromatic group or piperidine; a urea compound, such as o-tolyl thiourea; a sulfur compound, such as sodium diethyl thiophosphate or soluble salt of an aromatic sulfinic acid; a nitrile compound, such as N,N'-disubstituted-p-amino benzonitrile; a phosphorus compound, such as tri-n-butyl phosphine or sodium diethyl dithiophosphide; Michler's ketone; an N-nitroso hydroxylamine derivative; an oxazolidine compound; a tetrahydro-1,3-oxazine compound; and a nitrogen compound, such as a condensate of formaldehyde or acetaldehyde with an diamine. One kind of those sensitizers can be used alone, or several kinds thereof can be used in combination.

As the colorant, dyes and pigments which dissolve or stably disperse in the above mold material are suitable. The above-mentioned colorant used for the support material can be used therefor, but is not particularly limited. Further, two or more kinds of colorants can be mixed appropriately for color adjustment or the like.

In the present invention, it is preferable that the mold material contain a low-boiling point organic solvent (in particular, low-boiling point alcohol) so as to increase the drying speed. Examples of the low-boiling point alcohol include an aliphatic alcohol having 1 to 4 carbon atoms, such as methyl alcohol, ethyl alcohol, n-propyl alcohol, isopropyl alcohol, n-butyl alcohol, sec-butyl alcohol, tert-butyl alcohol, and isobutyl alcohol. One kind of those low-boiling point alcohols can be used alone, or several kinds thereof can be used in combination. A content of the low-boiling point solvent is preferably 1 to 30 wt %, more preferably 10 to 20 wt % with respect to the total weight of the ink composition. If the content exceeds 30 wt %, a problem in discharging property may occur, and if the content is less than 1 wt %, the drying speed may decrease.

A mechanism for curing the mold material could be an ultraviolet radiation lamp, an electron irradiation device, or the like. A mechanism to remove ozone is preferably provided. Examples of the lamp include a high-pressure mercury-vapor lamp, an ultra-high pressure mercury lamp, and metal halide. Although the ultra-high pressure mercury lamp is a point light source, a Deep UV type, whose light utilization efficiency has been improved by combining with an optical system, can irradiate light in a short wavelength region. The metal halide is effective for colored object because the metal halide emits light in a broad wavelength range. Halide of metal, such as Pb, Sn, or Fe, is used and can be selected according to an absorption spectrum of a photo initiator. A lamp effective for curing can be used without particular restriction. For example, commercially available lamps such as H lamp, D lamp, or V lamp (available from Fusion UV Systems, Inc.) can be used.

While some exemplary embodiments of this invention have been described in detail, those skilled in the art will recognize that there are many possible modifications and variations which may be made in these exemplary embodiments while yet retaining many of the novel features and advantages of the invention.

For example, an ink recovering or recycle mechanism or the like can be provided to the molding device 39, 39A. A blade for removing an ink adhered to a nozzle surface or a detecting mechanism for detecting a defective nozzle may be provided as well.

What is claimed is:

1. A three-dimensional laminating molding device comprising:
    a first ejecting unit that ejects a support material so as to form a support layer for burying a mold, the support material having a melting point;
    a second ejecting unit that ejects a mold material for a mold;
    a casing that houses the first and second ejecting units; and
    a controller that controls an inner temperature of the casing to a range from a temperature 30° C. lower than the melting point to a temperature 5° C. lower than the melting point.

2. A three-dimensional laminating molding device, comprising:
    a support material;
    a mold material that is an active-energy-ray curing compound;
    a first ejecting unit that ejects said support material so as to form a support layer for burying a mold, the support material having a melting point;
    a second ejecting unit that ejects said mold material for a mold;
    a casing that houses the first and second ejecting units; and
    a controller that controls an inner temperature of the casing to a range from a temperature 30° C. lower than the melting point to a temperature 5° C. lower than the melting point.

3. The three-dimensional laminating molding device according to claim 2, wherein the support material is a material that melts when irradiated with an active energy ray.

4. The three-dimensional laminating molding device according to claim 2, wherein the support material is a material that deforms when irradiated with an active energy ray.

5. A three-dimensional lamination device, comprising:
   a support material and a mold material, wherein the support material and mold material have different colors;
   a first ejecting unit that ejects a support material so as to form a support layer for burying a mold, the support material having a melting point;
   a second ejecting unit that ejects a mold material for a mold;
   a casing that houses the first and second ejecting units; and
   a controller that controls an inner temperature of the casing to a range from a temperature 30° C. lower than the melting point to a temperature 5° C. lower than the melting point.

6. The three-dimensional lamination device according to claim 5, wherein the support material contains a colorant.

7. The three-dimensional lamination device according to claim 6, wherein the support material is added with one of a black dye, a black pigment, a dark-colored dye, and a dark-colored pigment.

8. The three-dimensional laminating molding device according to claim 1, further comprising an irradiation device that irradiates an active energy ray, wherein the irradiation device is disposed adjacent to the first ejection head.

9. The three-dimensional laminating molding device according to claim 1, further comprising a pair of irradiation devices that irradiate active energy rays, wherein the pair of irradiation devices are adjacent the first and second ejection units.

10. A three-dimensional laminating molding device comprising:
   a support material that is solid at room temperature;
   a mold material that is liquid at room temperature;
   a first ejecting unit that ejects said support material so as to form a support layer for burying a mold, the support material having a melting point;
   a second ejecting unit that ejects said mold material for a mold;
   a casing that houses the first and second ejecting units; and
   a controller that controls an inner temperature of the casing to a range from 30° C. lower than the melting point to a temperature 5°0 C. lower than the melting point.

* * * * *